(12) United States Patent
Ogawa

(10) Patent No.: US 7,508,600 B2
(45) Date of Patent: Mar. 24, 2009

(54) OPTICAL SYSTEM AND OPTICAL APPARATUS INCLUDING THE SAME

(75) Inventor: Hideki Ogawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/146,278

(22) Filed: Jun. 25, 2008

(65) Prior Publication Data
US 2009/0009890 A1 Jan. 8, 2009

(30) Foreign Application Priority Data
Jul. 6, 2007 (JP) ............................. 2007-178129

(51) Int. Cl.
G02B 9/14 (2006.01)
G02B 15/14 (2006.01)
G02B 9/12 (2006.01)
G02B 3/02 (2006.01)

(52) U.S. Cl. ................. 359/785; 359/684; 359/689; 359/690; 359/784; 359/786; 359/716

(58) Field of Classification Search ............... 359/684, 359/689, 690, 708, 716, 754, 784–788
See application file for complete search history.

(56) References Cited

U.S. PATENT DOCUMENTS

| 4,241,983 | A | 12/1980 | Kitagishi et al. |
|---|---|---|---|
| 4,348,084 | A | 9/1982 | Kitagishi et al. |
| 5,629,799 | A | 5/1997 | Maruyama et al. |
| 5,638,215 | A | 6/1997 | Neil |
| 5,731,907 | A | 3/1998 | Sigler |
| 5,790,321 | A | 8/1998 | Goto |
| 6,115,188 | A | 9/2000 | Nishio et al. |
| 7,057,831 | B2 | 6/2006 | Ogawa |
| 7,193,789 | B2 | 3/2007 | Maetaki |
| 7,315,425 | B2 * | 1/2008 | Wada .................... 359/689 |

* cited by examiner

Primary Examiner—Ricky L Mack
Assistant Examiner—Jack Dinh
(74) Attorney, Agent, or Firm—Canon USA Inc IP Div

(57) ABSTRACT

An optical system includes at least one of a movable lens unit movable in an optical axis direction and a fixed lens unit that is not movable in the optical axis direction. The at least one lens unit includes a plurality of refractive optical elements. The refractive optical elements are made of resin and have focal lengths of the same sign. When $\phi i$ is a refractive power, with respect to d-line, of the $i^{th}$ refractive optical element from an object side, $\phi G$ is a refractive power of a negative lens in the lens unit including the refractive optical elements, and $\phi a$ is an average refractive power, with respect to d-line, of the refractive optical elements, $\phi i$, $\phi G$, and $\phi a$ are adequately set.

7 Claims, 7 Drawing Sheets

OPTICAL SYSTEM AND OPTICAL APPARATUS INCLUDING THE SAME

BACKGROUND OF THE INVENTION

1. Field of the Invention

The present invention relates to an optical system and an image pickup apparatus including the optical system. The present invention is applicable to an optical apparatus such as a silver-halide film camera, a digital still camera, a video camera, a telescope, binoculars, a projector, and a copy machine.

2. Description of the Related Art

In general, there is a demand for small optical systems having a small overall lens length (overall optical length, i.e., distance between a first lens surface on an object side and an image plane) for use in image-pickup apparatuses, such as digital cameras and video cameras.

As the overall size of the optical system is reduced, aberrations, in particular, chromatic aberrations including an axial chromatic aberration and a chromatic aberration of magnification are generally increased and the optical performance is degraded.

According to known methods for reducing the chromatic aberrations, an anomalous partial dispersion material is used as an optical material or a diffractive optical element is placed in an optical path.

In some telephoto type optical systems, the chromatic aberrations are corrected by placing a lens made of an anomalous partial dispersion material in a front lens unit, at which paraxial marginal rays and paraxial chief rays pass through positions distant from an optical axis. For example, the chromatic aberrations are corrected using a front lens unit including a lens with a positive refractive power composed of a low dispersion optical material, such as fluorite, having an anomalous partial dispersion and a lens with a negative refractive power composed of a high dispersion optical material. Examples of such telephoto type optical systems are described in U.S. Pat. Nos. 4,241,983, 4,348,084, and 6,115,188.

In other telephoto type optical systems, the chromatic aberrations are corrected without the use of the optical material having an anomalous partial dispersion by using a diffractive optical element. Examples of such telephoto type optical systems are described in U.S. Pat. Nos. 5,790,321 and 5,629,799. More specifically, U.S. Pat. Nos. 5,790,321 and 5,629,799 describe optical systems with an F-number of about 2.8 which relatively accurately correct the chromatic aberrations by combining a diffractive optical element and a refractive optical element.

In general, diffractive optical elements are characterized in that the absolute value of a numerical value corresponding to an Abbe number is small (around 3.45). In addition, simply by slightly changing the power (reciprocal of focal length) obtained by diffraction, the chromatic aberrations can be largely changed while hardly affecting a spherical aberration, a comma aberration, an astigmatism, etc.

A liquid material having a relatively high dispersion and a relatively anomalous partial dispersion is known as an optical material that provides a chromatic-aberration correcting function similar to that obtained by the optical characteristics of the diffractive optical elements. Achromatic optical systems using such a material are suggested in, for example, U.S. Pat. Nos. 5,731,907 and 5,638,215.

An optical system in which a mixture obtained by dispersing indium tin oxide (ITO) fine particles in a transparent medium is used as a material having anomalous partial dispersion characteristics to provide an achromatic function is also known (U.S. Pat. No. 7,057,831).

In addition, an optical system in which resin or mixture obtained by dispersing $TiO_2$ fine particles in a transparent medium is used as a material having anomalous partial dispersion characteristics to provide an achromatic function is also known (U.S. Pat. No. 7,193,789).

With the telephoto type optical system using fluorite or the like as the optical material, the chromatic aberrations can be easily corrected if the overall lens length is set to be relatively long.

However, if the overall lens length is reduced, the chromatic aberrations are increased and cannot be corrected with high reliability. This is because the chromatic aberrations generated by the front lens with the positive refractive power are simply reduced by using the material like fluorite that has low dispersion and an anomalous partial dispersion. To correct the chromatic aberrations increased as the overall lens length is reduced, in the lens having a low dispersion glass such as fluorite with a large Abbe number, the refractive power of a lens surface must be largely changed to change the chromatic aberrations.

Therefore, it is difficult to achieve both the correction of the chromatic aberrations and the correction of other aberrations, such as the spherical aberration, the coma aberration, and the astigmatism, which are generated as the refractive power is increased.

The diffractive optical element provides a sufficient chromatic-aberration correcting function. However, the diffractive optical element generates unnecessary diffracted light with diffraction orders other than that of the diffracted light used in practice. The unnecessary diffracted light functions as colored flare light that degrades the imaging performance.

In order to reduce the unnecessary diffracted light, a so-called layered diffractive optical element in which a plurality of blaze diffraction gratings are laminated along an optical axis can be used. Thus, the energy can be concentrated at the designed diffraction order and unnecessary diffracted light can be greatly reduced. However, when high-luminance objects are shot, flare is still generated because of the unnecessary diffracted light.

As a method for manufacturing the diffractive optical element, a method of forming the diffractive optical element composed of an ultraviolet curable resin or the like by molding is known. However, according to this method, the sensitivity of diffraction efficiency of the diffractive optical element is extremely high. Therefore, a high-accuracy mold must be used and high molding accuracy is required. Thus, the diffractive optical element is difficult to manufacture.

With the method using the liquid material, a structure for sealing the liquid material is necessary. Therefore, in the case of using the liquid material as an optical material, it is difficult to manufacture the structure in which the liquid material is sealed. In addition, the characteristics including the refractive index, dispersion, etc., vary in accordance with the temperature variation and it is difficult to maintain a high environment resistance.

ITO, which is used as an optical material for correcting the chromatic aberrations, has a relatively low permeability compared to other optical materials.

Therefore, if ITO is used as the material having an anomalous partial dispersion for forming a lens or a layer having a refractive power in an optical system, the chromatic aberrations must be corrected without increasing the thickness of the lens or the layer in an optical axis direction.

SUMMARY OF THE INVENTION

The present invention is directed to an optical system that can reliably correct aberrations including chromatic aberrations, that can be easily manufactured, and that shows high environment resistance, and an optical apparatus including the optical system.

An optical system of at least one aspect of the present invention includes at least one of a movable lens unit movable in an optical axis direction and a fixed lens unit that is not movable in the optical axis direction. The at least one lens unit includes a plurality of refractive optical elements, the refractive optical elements being made of resin and having focal lengths of the same sign. When $N_{gi}$, $N_{Fi}$, $N_{di}$, and $N_{Ci}$ indicate refractive indices, with respect to g-line, F-line, d-line, and C-line, respectively, of a material of the $i^{th}$ refractive optical element from an object side, an Abbe number vi and a partial dispersion ratio θi of the material of the $i^{th}$ refractive optical element are determined as follows:

$$vi = (N_{di} - 1)/(N_{Fi} - N_{Ci})$$

$$\theta i = (N_{gi} - N_{Fi})/(N_{Fi} - N_{Ci})$$

The lens unit including the refractive optical elements has one or more negative lenses. When φi is a refractive power, with respect to d-line, of the $i^{th}$ refractive optical element, φG is a refractive power of one of the negative lenses that is made of a material having the highest dispersion, and φa is an average refractive power for d-line of the refractive optical elements, the following conditions are satisfied:

$$-2.100 \times 10^{-3} \cdot vi + 6.93 \times 10^{-1} < \theta i < 0.9$$

$$vi < 30$$

$$-0.9 < \sum_{i=1}^{n} \phi i / \phi G < -0.1$$

$$0.3 < \phi i / \phi a < 3.0$$

wherein i=1, 2, . . . , n, and n≧2.

Further features of the present invention will become apparent from the following description of exemplary embodiments with reference to the attached drawings.

DESCRIPTION OF THE EMBODIMENTS

Figure 1:
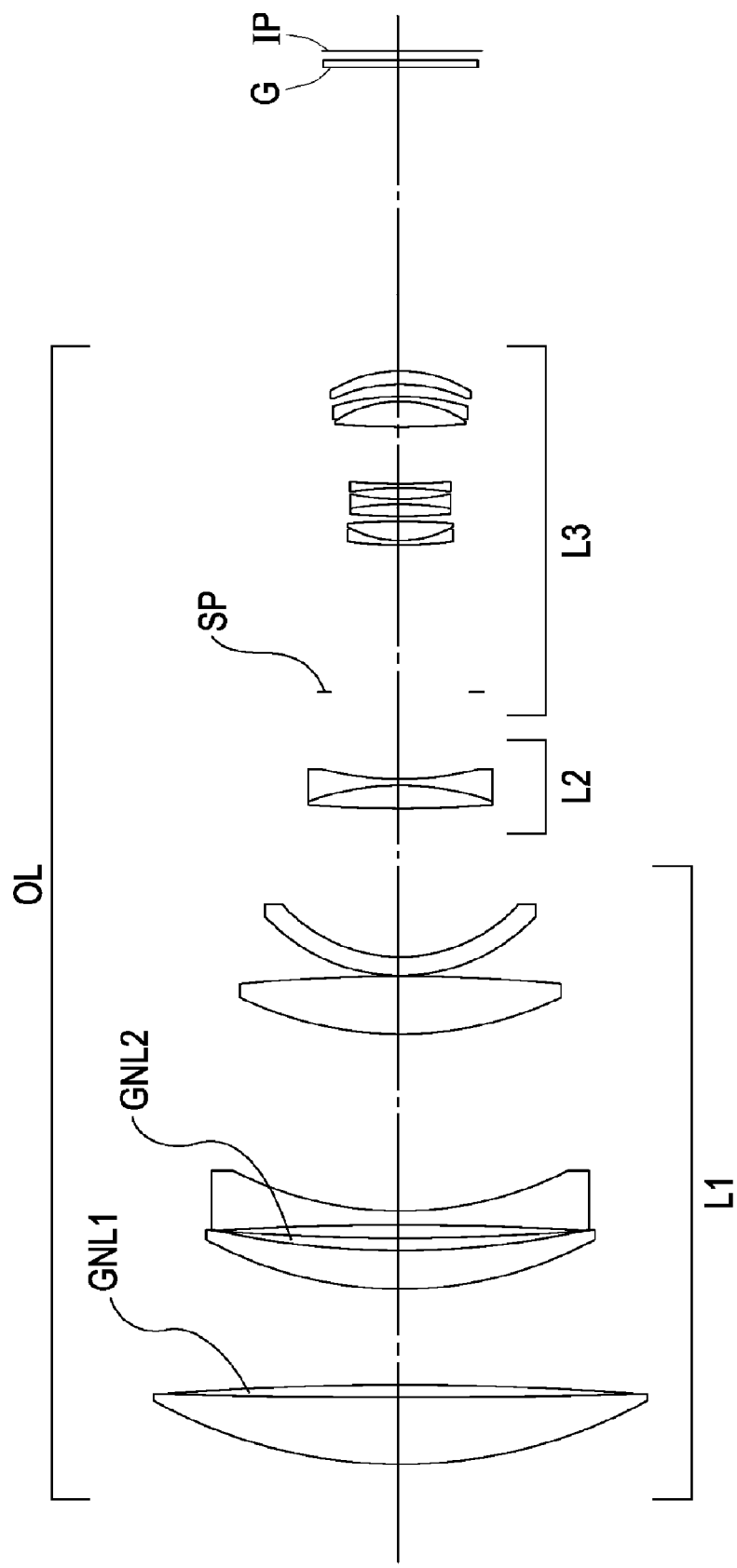
FIG. 1 illustrates a sectional view of an optical system according to a first numerical example of the present invention.

Optical systems and optical apparatuses including the optical systems according to embodiments of the present invention will be described below.

Optical systems according to embodiments of the present invention can be used in image pickup apparatuses, such as digital cameras, video cameras, and silver-halide film cameras, observing apparatuses, such as telescopes and binoculars, and in other optical apparatuses like copy machines and projectors.

According to each embodiment of the present invention, an optical system includes at least one of a movable lens unit that is movable in an optical axis direction and a fixed lens unit that is not movable in the optical axis direction. The optical system includes a plurality of refractive optical elements GNL disposed in the at least one of the lens units. The refractive optical elements GNL are made of high-dispersion resin that has a high partial dispersion ratio and that satisfies the following Conditional Expressions (1) to (3). The focal lengths of the refractive optical elements GNL have the same sign.

The refractive optical elements GNL are obtained as a result of photopolymerization or thermal polymerization of the resin.

In each embodiment, the refractive optical elements GNL are disposed in the optical system at the positions explained below.

In each embodiment, the chromatic aberrations of the optical system are corrected by the refractive optical elements GNL. The optical system according to each embodiment includes a negative lens composed of a refractive optical element made of a material different from that of the refractive optical elements GNL. The negative lens is made of a high-dispersion material (material having a high partial dispersion ratio). The negative lens enhances the curvature of a wavelength characteristic curve of a chromatic aberration coefficient.

The refractive optical elements GNL are configured to have a positive refractive power so as to eliminate the curvature.

Therefore, at least one of the refractive optical elements GNL is disposed so as to face one of negative lenses that has the highest dispersion in the lens unit in which the refractive optical elements GNL are disposed. Thus, the chromatic aberrations are reliably corrected.

In addition, at least one of the remaining refractive optical elements is disposed on the object side relative to the refractive optical element that faces the negative lens having the highest dispersion, that is, at a position where paraxial marginal rays and off-axis rays pass through positions distant from an optical axis. Thus, the chromatic aberrations are corrected in a balanced manner.

Next, the material of the refractive optical elements GNL included in the optical system according to each embodiment will be described.

The material of the refractive optical elements GNL can be, for example, resin. As the resin, mixtures obtained by dispersing UV-curable resin, N-polyvinylcarbazole, or $TiO_2$ in resin can be used.

With UV-curable resin, nd=1.635, vd=22.7, and θgF=0.69. With N-polyvinylcarbazole, nd=1.696, vd=17.7, and θgF=0.69. With $TiO_2$, nd=2.304, vd=13.8, and θgF=0.87. Here, nd indicates the refractive index, vd indicates the Abbe number, and θgF indicates the partial dispersion ratio. The resin used in each embodiment is not limited to the above-mentioned materials.

In the embodiments described below, UV-curable resin is used as the material of the refractive optical elements GNL. In the optical system according to each embodiment, the refractive optical elements GNL are provided as lenses or layers disposed on lens surfaces.

The refractive surfaces of the refractive optical elements GNL are spherical. Therefore, chromatic aberration flare, such as chromatic spherical aberration, is reliably corrected.

Interfaces can be formed between the refractive optical elements GNL and atmosphere, such as air, or between the refractive optical elements GNL and materials having a relatively low refractive index. In such a case, the chromatic aberrations can be relatively largely varied in response to a small variation in the curvature of the interfaces.

The optical systems according to the embodiments will now be described. In each embodiment, UV-curable resin (nd=1.635, vd=22.7, and θgF=0.69) is used as the material of the refractive optical elements GNL.

FIG. 1 illustrates a sectional view of an optical system according to a first numerical example of the present invention. The optical system shown in FIG. 1 is a super-telephoto lens with a focal length of 800 mm.

In FIG. 1, the left side shows the object side (front) and the right side shows the image side (rear). This also applies to other numerical examples. The optical system is denoted by OL.

The optical system OL includes an aperture stop SP, a first lens unit L1 having a positive refractive power, a second lens unit L2 having a negative refractive power, and a third lens unit L3. The second lens unit L2 moves along an optical axis for focusing. The optical system OL includes refractive optical elements GNL1 and GNL2 composed of lenses (layers) made of UV-curable resin. The refractive optical elements GNL1 and GNL2 are disposed in the first lens unit L1.

G denotes a glass block (plate), which functions as a face-plate, a filter, etc., and IP denotes an image plane. When the optical system OP is used as an imaging optical system of a video camera or a digital still camera, the image plane IP corresponds to an image pickup plane of a solid-state image pickup device (photoelectric converter), such as a charged coupled device (CCD) sensor and a metal-oxide semiconductor (CMOS) sensor. When the optical system OP is used in a silver-halide film camera, the image plane IP corresponds to a film surface.

In the optical system according to the first numerical example, the refractive optical element GNL1, which has a positive refractive power, is disposed at a position where the paraxial marginal rays and the off-axis rays pass through positions distant from an optical axis in the first lens unit L1. The refractive optical element GNL2, which also has a positive refractive power, is disposed so as to face (is disposed next to) a negative lens made of a material with the highest dispersion in the first lens unit L1.

Each of the refractive optical elements GNL1 and GNL2 is configured to have an adequate positive refractive power. Therefore, a compact (small) super-telephoto lens can be obtained which can reliably correct the chromatic aberrations even though the resin layers of the refractive optical elements GNL1 and GNL2 are relatively thin.

Figure 2:
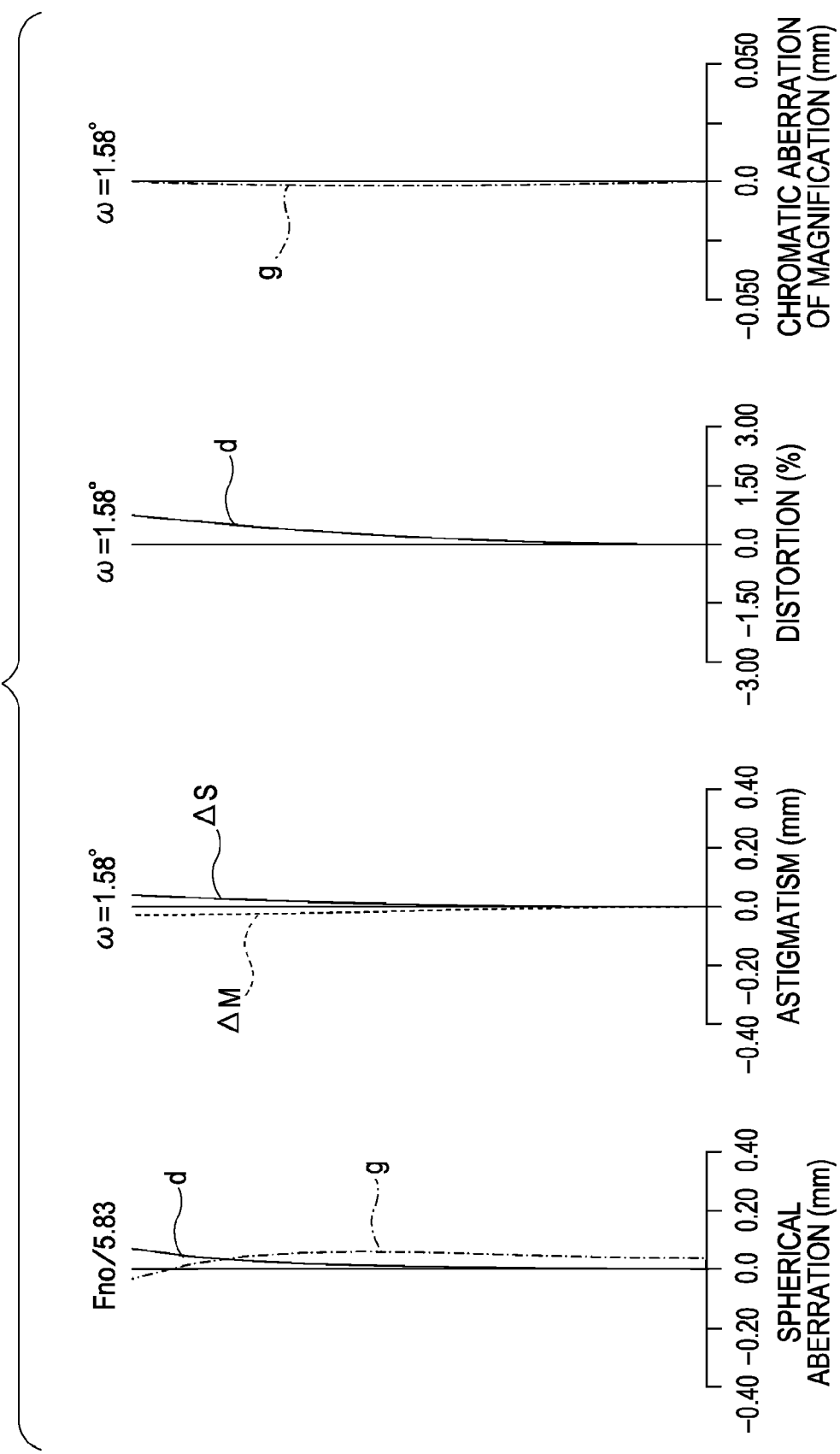
FIG. 2 illustrates aberration diagrams of the optical system according to the first numerical example in the state in which an object at infinity is in focus.

FIG. 2 illustrates aberration diagrams of the optical system according to the first numerical example in the state in which an object at infinity is in focus. In the aberration diagrams, d and g indicate the d-line and the g-line, respectively.

In addition, ΔS and ΔM are a meridional image plane and a sagittal image plane, respectively, with respect to the d-line. The chromatic aberration of magnification is shown by the g-line. Fno indicates the F number, and ω indicates the half field angle. This also applies to other numerical examples.

Figure 3:
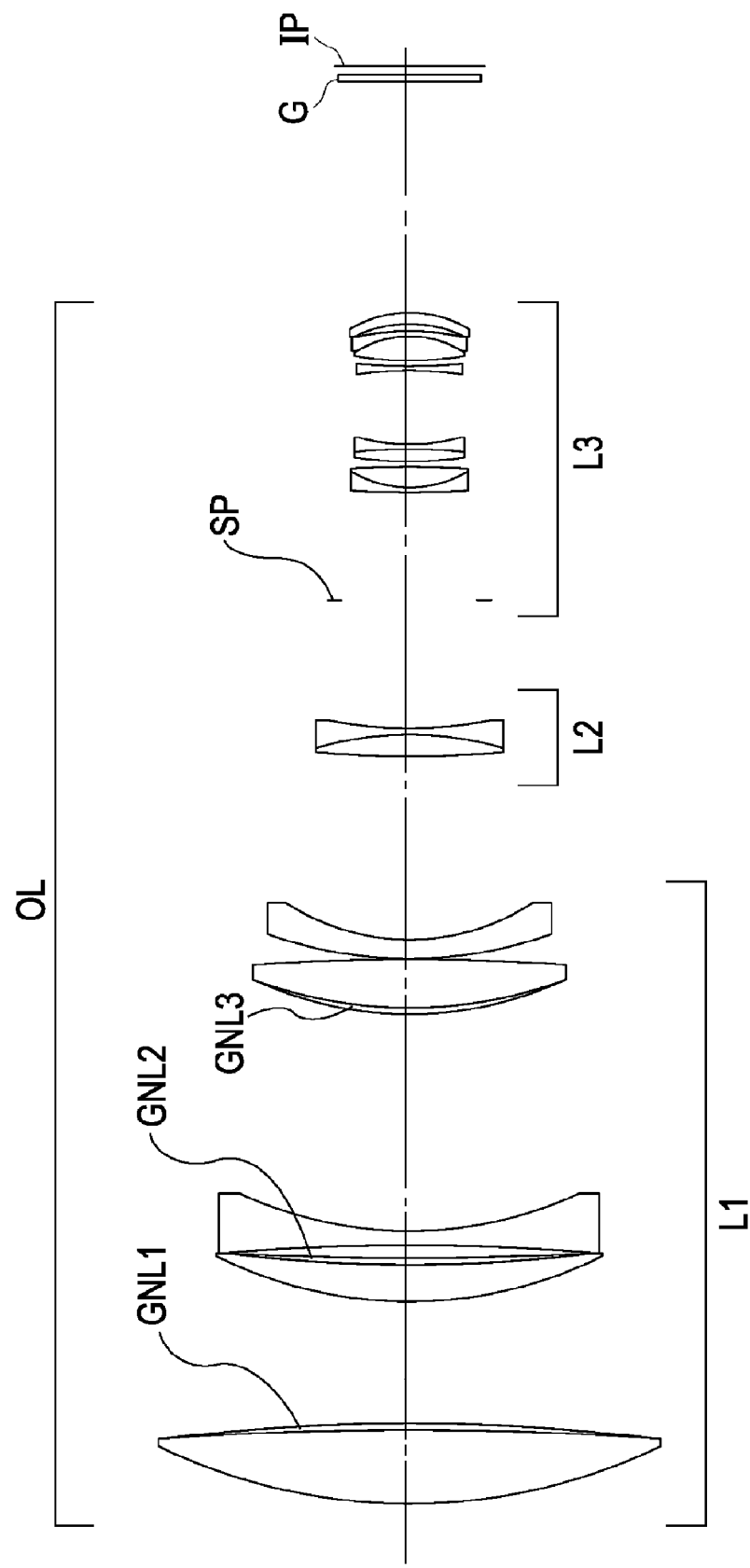
FIG. 3 illustrates a sectional view of an optical system according to a second numerical example of the present invention.

FIG. 3 illustrates a sectional view of an optical system according to a second numerical example of the present invention. The optical system shown in FIG. 3 is a super-telephoto lens with a focal length of 800 mm.

Referring to FIG. 3, an optical system OL includes an aperture stop SP, a first lens unit L1 having a positive refractive power, a second lens unit L2 having a negative refractive power, and a third lens unit L3. The second lens unit L2 moves along an optical axis for focusing. The optical system OL also includes refractive optical elements GNL1, GNL2, and GNL3 composed of lenses (layers) made of UV-curable resin. The refractive optical elements GNL1, GNL2, and GNL3 are disposed in the first lens unit L1.

In the optical system of the second numerical example, the refractive optical element GNL1, which has a positive refractive power, is disposed at a position where the paraxial marginal rays and the off-axis rays pass through positions distant from an optical axis in the first lens unit L1. The refractive optical element GNL2, which also has a positive refractive power, is disposed so as to face (is disposed next to) a negative lens made of a material with the highest dispersion in the first lens unit L1. The refractive optical element GNL3 is disposed on the image side of the refractive optical element GNL2.

Each of the refractive optical elements GNL1, GNL2, and GNL3 is configured to have an adequate positive refractive power. Thus, a compact super-telephoto lens can be obtained which can reliably correct the chromatic aberrations even though the resin layers of the refractive optical elements GNL1, GNL2, and GNL3 are relatively thin.

Figure 4:
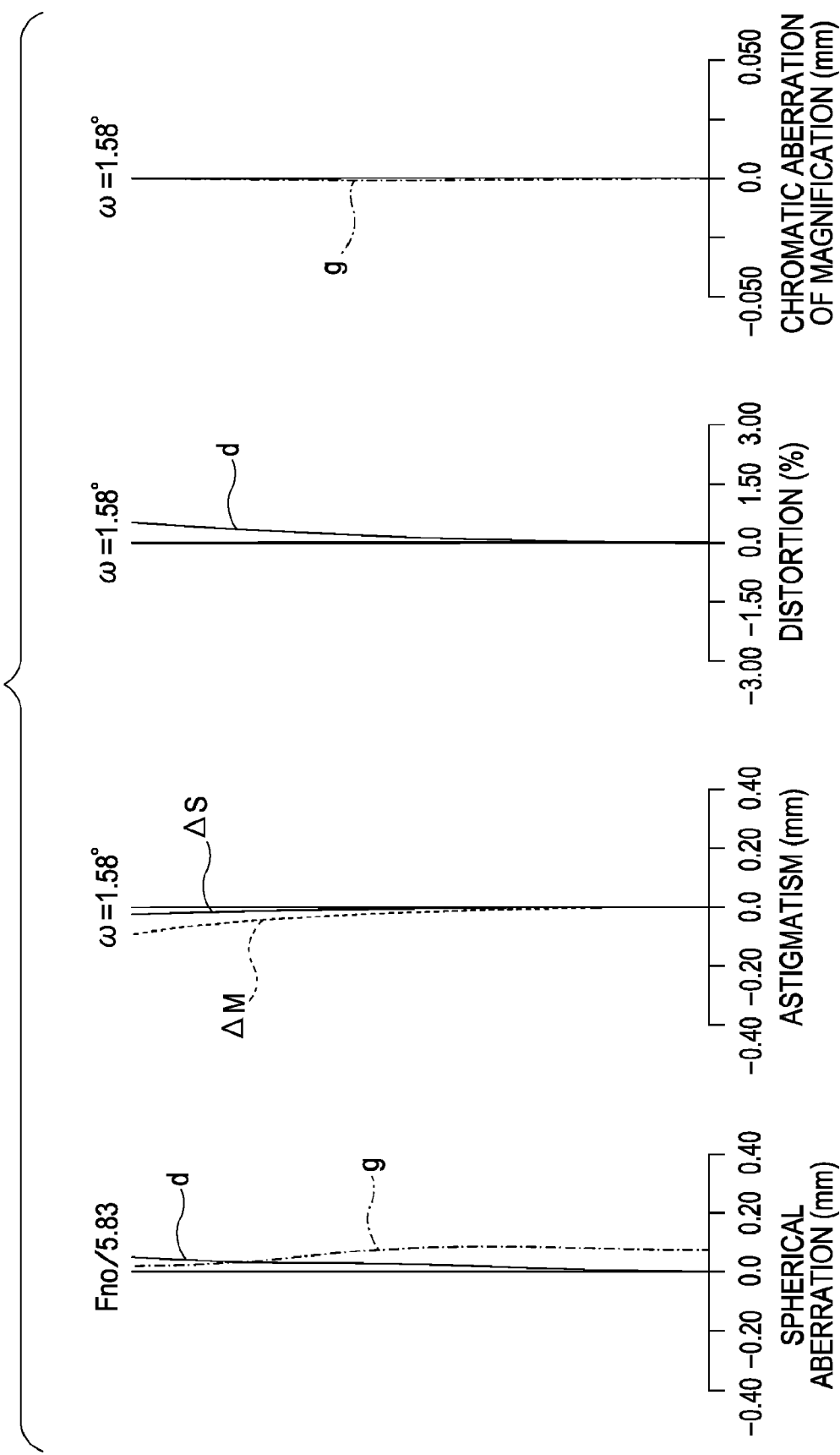
FIG. 4 illustrates aberration diagrams of the optical system according to the second numerical example in the state in which an object at infinity is in focus.

FIG. 4 illustrates aberration diagrams of the optical system according to the second numerical example in the state in which an object at infinity is in focus.

According to each of the first and second numerical examples, the optical system is a telephoto type optical system including the first lens unit L1 having a positive refractive power, the second lens unit L2 having a negative refractive power that moves in the axial direction for focusing, and the third lens unit L3 having a positive refractive power.

In the optical system of each of the first and second numerical examples, P indicates a point where a paraxial chief ray intersects the optical axis. When HF is the maximum height from the optical axis of positions at which the paraxial marginal rays pass through lens surfaces in an area on the magnifying side (object side) of the point P and HR is the maximum height from the optical axis of positions at which the paraxial marginal rays pass through lens surfaces in an area on the reducing side (image side) of the point P, the telephoto type optical system satisfies the following expression:

HR<HF

In the first and second numerical examples, the second lens unit L2 can be fixed and focusing can be performed by integrally moving the first to third lens unit L1 to L3.

In such a case, the entire system can be considered as a fixed lens unit that is not movable in the optical axis direction or a movable lens unit.

The optical systems according to the numerical examples of the present invention can be included not only in telephoto lenses but also in standard lenses or in retrofocus wide-angle lenses.

Figure 5:
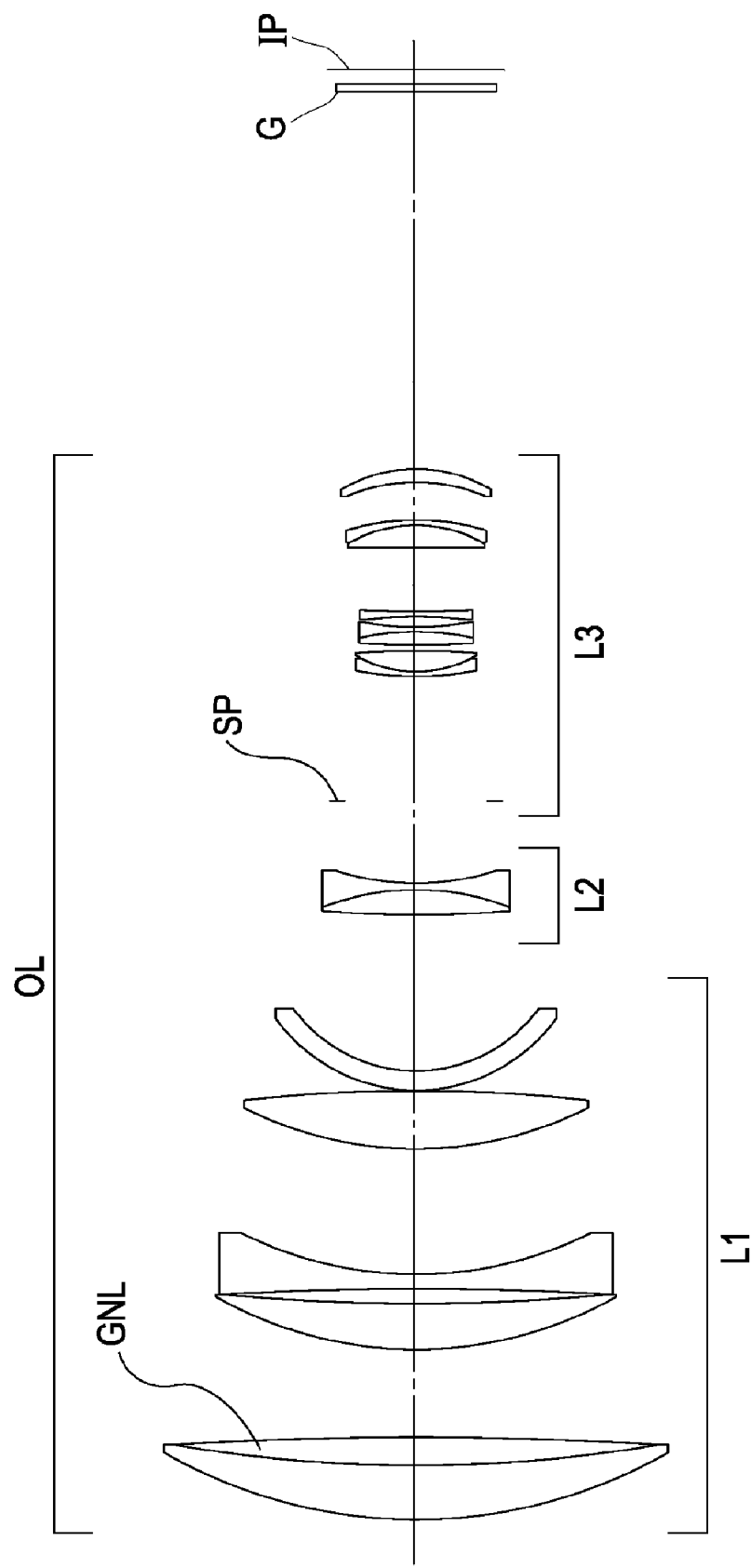
FIG. 5 illustrates a sectional view of an optical system according to a comparative example.

FIG. 5 illustrates a sectional view of an optical system according to a comparative example. Similar to the first and second numerical examples, an optical system OL shown in FIG. 5 is a super-telephoto lens with a focal length of 800 mm.

According to the comparative example shown in FIG. 5, optical performance similar to that of the first and second numerical examples is obtained using a single refractive optical element GNL. The refractive optical element GNL according to the comparative example has an extremely large resin thickness (thickness along the optical axis) compared to those of the refractive optical elements GNL of the first and second numerical examples.

Referring to FIG. 5, the optical system OL includes an aperture stop SP, a first lens unit L1 having a positive refractive power, a second lens unit L2 having a negative refractive power, and a third lens unit L3. The second lens unit L2 moves along an optical axis for focusing. The optical system OL includes a refractive optical element GNL composed of a lens (layer) made of UV-curable resin. The refractive optical element GNL is disposed in the first lens unit L1.

Figure 6:
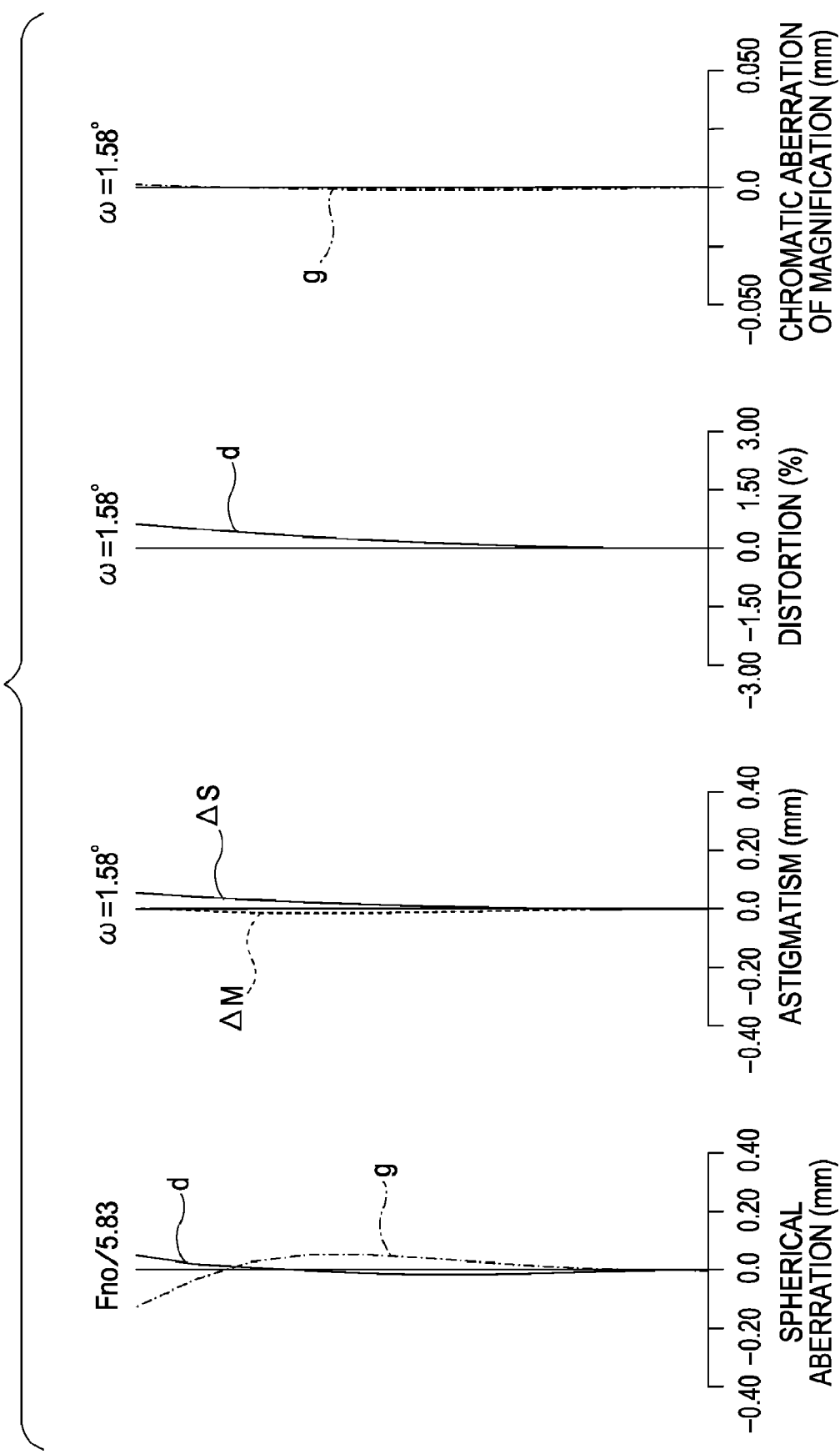
FIG. 6 illustrates aberration diagrams of the optical system according to the comparative example in the state in which an object at infinity is in focus.

FIG. 6 illustrates aberration diagrams of the optical system according to the comparative example in the state in which an object at infinity is in focus.

A well-known method for correcting the chromatic aberrations will be described before explaining the characteristics of the optical systems according to the embodiments of the present invention.

First, a dispersion characteristic of an optical material will be described.

In a wavelength characteristic (dispersion characteristic) of a refractive index of the optical material, the Abbe number (vd) indicates the overall gradient of the dispersion characteristic curve, and the partial dispersion ratio (θgF) indicates the degree of curvature of the dispersion characteristic curve.

In general, the refractive index of an optical material on the short-wavelength side is higher than that on the long-wavelength side (the Abbe number is positive), and the dispersion characteristic curve is convex downward (the partial dispersion ratio is positive). As the wavelength is reduced, variation in the refractive index relative to variation in the wavelength is increased.

In addition, as the Abbe number is reduced and the dispersion is increased, the partial dispersion ratio of the optical material and the degree of curvature of the dispersion characteristic curve that is convex downward are increased.

A wavelength dependent characteristic curve of a chromatic aberration coefficient of a lens surface made of an optical material with a large partial dispersion ratio has a larger curvature on the short wavelength side than that of a lens surface made of an optical material with a small partial dispersion ratio.

A wavelength dependent characteristic curve of a chromatic aberration coefficient of a lens surface made of an optical material with a small partial dispersion ratio is close to a straight line over the entire usable wavelength range.

The partial dispersion ratio of a general optical material, such as glass, varies substantially linearly with respect to the Abbe number. Optical materials with anomalous partial dispersion characteristics have characteristics deviated from this linear line.

Examples of low-dispersion optical materials having the anomalous partial dispersion characteristics include fluorinated materials, such as fluorite and UD glass, having a relatively high partial dispersion ratio. Examples of high-dispersion optical materials having the anomalous partial dispersion characteristics include short-flint type materials or some lanthanum-type materials having a relatively low partial dispersion ratio. The partial dispersion ratios of the above-mentioned glass materials are close to the linear line.

Next, a known method for using the general anomalous partial dispersion materials in an optical system (imaging optical system) will be described.

Many imaging optical systems, such as telephoto lenses, have a positive refractive power as a whole. Therefore, the number of positive lenses (lenses having positive refractive power) included in the optical systems is generally larger than the number of negative lenses (lenses having negative refractive power).

In a telephoto-type lens, chromatic aberrations of the entire optical system are mainly generated by lens units disposed in front of an aperture stop (i.e., lens units on the object side of the aperture stop in an imaging optical system and lens units on the magnifying side of the aperture stop in a liquid crystal projector).

In the telephoto lens, the lens units on the object side of the aperture stop are configured such that the positive lenses, the number of which is relatively large, are made of a low-dispersion material so that the overall gradient of the wavelength characteristic curve of the chromatic aberration coefficient can be reduced.

The negative lenses, the number of which is relatively small, are made of a high-dispersion material. The positive and negative lenses are configured to have adequate refractive powers so as to cancel the overall gradient of the wavelength characteristic curve of the chromatic aberration coefficient accumulated by the positive lenses made of the low-dispersion material.

Further, in view of the curvature of the wavelength characteristic curve of the chromatic aberration coefficient, a material having a relatively high partial dispersion ratio compared to that of a typical low-dispersion material is used to form the positive lenses made of the low-dispersion material. In addition, a material having a relatively low partial dispersion ratio compared to that of a typical high-dispersion material is used to form the negative lenses composed of the high-dispersion material. Thus, the curvature of the wavelength characteristic curve of the chromatic aberration coefficient accumulated by the positive lenses made of the low-dispersion material is canceled.

The positive lenses are made of a fluorinated material, such as fluorite and UD glass, that has low dispersion and a relatively high partial dispersion ratio. The negative lenses are made of a material like short-flint type materials and some lanthanum-type materials that has high dispersion and a relatively low partial dispersion ratio. Thus, the gradient and the curvature of the wavelength characteristic curve of the chromatic aberration of the entire optical system can be balanced.

However, with the combination of the anomalous partial dispersion materials, in many imaging optical systems such as telephoto lenses, the curvature of the wavelength characteristic curve of the chromatic aberration coefficient caused by the large curvature of the dispersion characteristic curve of the negative lenses overcorrects the curvature accumulated by the positive lenses. As a result, on the wavelength characteristic curve of the axial chromatic aberration coefficient of the entire optical system, the chromatic aberrations remain as a so-called achromatic curve that is convex upward.

The residual chromatic aberrations enhance the refractive powers of the lenses included in the optical system and are increased as the overall length of the lens system is reduced. Therefore, it is difficult to correct the chromatic aberrations as long as the above-described known method is used for using the general anomalous partial dispersion materials in the optical system.

Next, a method for using diffractive optical elements, which are commonly used in various types of optical systems, in imaging optical systems to correct the chromatic aberrations will be described.

As described above, a general optical material constantly has a positive Abbe number, and the dispersion characteristic curve thereof is more or less convex downward.

A refractive index (equivalent value) of a diffractive optical element on the long wavelength side is higher than a refractive index (equivalent value) thereof on the short wavelength side. The Abbe number (equivalent value) of the diffractive optical element is −3.45, and the sign thereof is negative. The refractive index (equivalent value) of the diffractive optical element varies uniformly relative to the wavelength. Thus, the diffractive optical element shows a linear dispersion characteristic, and has a super-high dispersion and a super-low partial dispersion ratio.

Therefore, the wavelength characteristic of the chromatic aberration coefficient is also completely linear, and the gradient thereof can be freely controlled with the linear state maintained by varying the power of the diffractive optical element.

The refractive optical system unit is only required to be configured such that a linear state can be formed in accordance with the linearity of the wavelength characteristic of the aberration coefficient of the diffractive optical element, and the gradient thereof can be ignored. The residual gradient can be easily corrected by adjusting the power of the diffractive optical element.

Since the diffractive optical element has a super-high dispersion, variation in the power of the diffractive optical element hardly affects the aberrations such as the spherical aberration. Thus, the chromatic aberrations can be highly independently corrected.

To increase the linearity of the wavelength characteristic of the chromatic aberration coefficient, the refractive optical system unit can be structured as follows. That is, materials of both the positive and negative lenses can be selected in a manner opposite to that in the above-described known method for using the general anomalous partial dispersion materials.

In other words, the dispersion can be ignored and one of the following structures can be employed.

The structure in which the positive lenses are made of a material having a high partial dispersion ratio (high dispersion as a result) so that the curvature of the wavelength characteristic curve of the chromatic aberration coefficient of the negative lenses can be canceled.

The structure in which the negative lenses are made of a material having a low partial dispersion ratio (low dispersion as a result) so that the curvature of the wavelength characteristic curve of the chromatic aberration coefficient of the positive lenses can be canceled.

The structure in which the materials of the positive lenses and the negative lenses are both reselected as mentioned above so as to cancel the curvature.

The sign of the power to be provided by the diffractive optical element for canceling the chromatic aberration coefficient of the refractive optical system unit will now be described. In, for example, a telephoto lens, when the diffractive optical element is disposed on the object side relative to the aperture stop, positive power must be provided to cancel both the coefficient of axial chromatic aberration and the coefficient of chromatic aberration of magnification.

Also when a component made of a material including indium tin oxide (ITO) fine particles is used in an imaging optical system, the component provides a function similar to that of the diffractive optical element because the material including ITO fine particles have high dispersion and a super low partial dispersion ratio. Since the Abbe number is positive, negative power is provided when the component is disposed on the object side relative to the aperture stop in the telephoto lens.

The well-known method of correcting the chromatic aberrations has been described.

In the lens unit disposed on the object side relative to the aperture stop in the telephoto lens, a lens made of a fluorinated material, such as fluorite and UD glass, with low dispersion and a relatively high partial dispersion ratio is configured to have a positive refractive power. In addition, a lens made of a material like short-flint type materials or some lanthanum-type materials with high dispersion and a relatively low partial dispersion ratio is configured to have a negative refractive power.

In this manner, the gradient and the curvature of the chromatic-aberration wavelength characteristic curve are reduced. This method and a method of cancelling the gradient and the curvature of the chromatic-aberration wavelength characteristic curve by using a diffractive optical element with a positive power that is disposed on the object side relative to the aperture stop and that has a super-high dispersion and a super-low partial dispersion ratio are often used.

Next, a method for using an optical element made of a material with high dispersion and high partial dispersion in an optical system according to the embodiments of the present invention will be described below.

As an example, a coefficient of axial chromatic aberration of a super-telephoto lens including a refractive optical element GNL made of a material having a high partial dispersion ratio and a refractive optical element G made of another material will be described.

Assume that the chromatic aberrations are somewhat corrected in a partial system including the refractive optical element G.

In this case, the wavelength characteristic curve of the axial chromatic aberration is convex upward and a so-called achromatic state is established.

The refractive optical element G is constituted of a negative lens made of a material with a relatively high partial dispersion ratio. Since the material having a high partial dispersion ratio also has high dispersion, the wavelength characteristic curve of the chromatic aberration coefficient of the refractive optical element G is curved further upward compared to the original state. In addition, the overall gradient is changed such that the chromatic aberration coefficient on the short wavelength side is shifted in the negative direction.

Then, the refractive optical element GNL made of the material having a high partial dispersion ratio is configured to have a positive refractive power. Accordingly, the wavelength characteristic curve of the chromatic aberration coefficient of the refractive optical element GNL is curved further downward and the overall gradient is changed such that the chromatic aberration coefficient on the short wavelength side is shifted in the positive direction. When the refractive power of the refractive optical element GNL is set to a certain value, the wavelength characteristic curve of the chromatic aberration coefficient of the refractive optical element GNL becomes substantially symmetrical about the wavelength axis to the wavelength characteristic curve of the chromatic aberration coefficient of the refractive optical element G.

However, in many cases, it is difficult to make both the overall gradient and the curvature of the wavelength characteristic curve of the chromatic aberration coefficient of the refractive optical element GNL symmetrical to those of the wavelength characteristic curve of the chromatic aberration coefficient of the refractive optical element G at the same time. Therefore, the refractive power of the refractive optical element GNL is adjusted so as to cancel only the curvature, and the overall gradient is canceled by reselecting the material of a positive lens included in the refractive optical element G.

Since the positive lens included in the refractive optical element G is made of a low-dispersion material, the absolute value of the partial dispersion ratio is smaller than that of a high-dispersion material. Therefore, the overall gradient can be corrected while hardly affecting the curvature of the wavelength characteristic curve of the chromatic aberration coefficient by changing the material to those having similar characteristics.

In the embodiments of the present invention, the positive lens included in the refractive optical element G is formed of a material having relatively high dispersion, so that the chromatic aberration coefficient of the refractive optical element G on the short wavelength side is shifted in the positive direction.

As described above, the optical system (telephoto lens) according to each embodiment of the present invention includes the refractive optical element G having a negative lens on the object side relative to the aperture stop. The negative lens is made of a material having high dispersion (high partial dispersion ratio) so as to enhance the curvature of a wavelength characteristic curve of the chromatic aberration coefficient.

The refractive optical element GNL with the positive refractive power is disposed on the object side relative to the aperture stop in the optical system so as to cancel the curvature. In addition, the overall gradient is canceled by changing the material of the positive lens on the object side relative to the aperture stop in the optical system. Thus, the chromatic aberrations are reliably corrected.

Here, $\nu$ and $\phi$ respectively indicate the Abbe number and the refractive power of the refractive optical element GNL and $\Delta\theta$ indicates the difference between the partial dispersion ratio $\theta gF$ of the refractive optical element GNL and the partial dispersion ratio of a general glass material having the Abbe number $\nu$. Although the achromatic effect of the refractive optical element GNL is affected by the structure of the refractive optical element G, the achromatic effect is basically proportional to $\Delta\theta \cdot \phi/\nu$.

Therefore, as the difference $\Delta\theta$ and the refractive power $\phi$ are increased and the Abbe number $\nu$ is reduced, the achromatic effect of the refractive optical element GNL is increased. However, since the optical constant of the glass forming the lens in the refractive optical element G is limited, the chromatic aberrations can be increased if the values of the above-mentioned parameters are excessively increased.

However, if the material of the refractive optical element GNL is determined, the chromatic aberrations can be canceled only by increasing the refractive power $\phi$. Therefore, the resin thickness of the refractive optical element GNL is increased.

As a result, the following problems occur.

The surface accuracy is reduced in the manufacturing process due to uneven curing contraction of the resin. In addition, birefringence and refractive index distribution are generated.

The surface accuracy and the refractive index vary in accordance with the temperature variation and humidity variation.

Therefore, to avoid the above-mentioned problems while using the refractive optical element GNL having a certain optical constant to adequately cancel the chromatic aberrations, the following structure can be employed. That is, a plurality of refractive optical elements GNL having refractive powers of the same sign can be provided. In such a case, the resin thickness of each refractive optical element GNL can be reduced.

However, if a plurality of refractive optical elements are simply provided, it is difficult to cause each refractive optical element GNL to provide sufficient chromatic-aberration correcting function.

Therefore, according to the prevent invention, the above-described refractive optical elements GNL are provided. Each of the refractive optical elements GNL is adequately set so that the resin thickness of each refractive optical element GNL can be reduced without degrading the chromatic-aberration correcting function.

In general, when the optical system includes a plurality of lens units including a movable lens unit, the aberration-correcting function tends to be degraded if the refractive optical elements are disposed in different lens units having largely different functions regarding the aberrations. In such a case, the resin thickness of each refractive optical element cannot always be reduced.

Therefore, in the optical system according to each embodiment of the present invention, a plurality of refractive optical elements GNL having refractive powers of the same sign are disposed in a single lens unit to reduce the resin thickness of each refractive optical element GNL.

Characteristics of the optical system according to each embodiment of the present invention other than the above-described characteristics will now be described.

$N_{gi}$, $N_{Fi}$, $N_{di}$, and $N_{Ci}$ respectively indicate the refractive indices with respect to the g-line, F-line, d-line, and C-line of the material of the $i^{th}$ refractive optical element from the object side. The Abbe number $\nu i$ and the partial dispersion ratio $\theta i$ are obtained as follows:

$$\nu i = (N_{di} - 1)/(N_{Fi} - N_{Ci})$$

$$\theta i = (N_{gi} - N_{Fi})/(N_{Fi} - N_{Ci})$$

The refractive power of the $i^{th}$ refractive optical element with respect to the d-line is represented by $\phi i$.

The lens unit in which the refractive optical elements are disposed includes one or more negative lenses, and the refractive power of one of the negative lenses that is made of a material having the highest dispersion is represented by $\phi G$. If there is only one negative lens, $\phi G$ indicates the refractive power of that negative lens.

When $\phi a$ indicates the average refractive power of the refractive optical elements with respect to the d-line, the following conditions are satisfied:

$$-2.100 \times 10^{-3} \cdot \nu i + 6.93 \times 10^{-1} < \theta i < 0.9 \quad (1)$$

$$\nu i < 30 \quad (2)$$

$$-0.9 < \sum_{i=1}^{n} \phi i/\phi G < -0.1 \quad (3)$$

$$0.3 < \phi i/\phi a < 3.0 \quad (4)$$

wherein i=1, 2, ..., n, and n≧2.

The Conditional Expressions (1) and (2) show the numerical ranges to be satisfied by the partial dispersion ratio $\theta gF$ and the Abbe number $\nu d$ of the refractive optical elements GNL.

The refractive optical elements GNL are used in combination with general optical materials. Therefore, although the partial dispersion ratio of the material of the refractive optical elements GNL must be different from that of a general optical material, the aberrations cannot be adequately corrected if the partial dispersion ratios are excessively different from each other. If a lens having a partial dispersion ratio that is excessively different from that of a general optical material is used, the curvature of the wavelength characteristic curve of the chromatic aberration coefficient at the lens surface will be increased on the short wavelength side. Therefore, the refractive powers of other lenses must be increased to cancel the curvature. If the refractive powers are increased, the aberrations including the spherical aberration, the comma aberration, and the astigmatism can be increased.

Therefore, the value of Conditional Expression (1) is set to be lower than the upper limit thereof.

If the value of Conditional Expression (1) is lower than the lower limit thereof, the chromatic aberrations cannot be adequately corrected.

If the absolute value of the Abbe number of the refractive optical elements GNL is small, that is, if the dispersion is high, the level of independence of chromatic aberration correction can be increased.

This will be described in more detail using the coefficient of axial chromatic aberration and the coefficient of chromatic aberration of magnification of a lens surface.

When the variation in power of a refractive lens surface is $\Delta\phi$, variation $\Delta L$ in the coefficient of axial chromatic aberration and variation $\Delta T$ in the coefficient of chromatic aberration of magnification at the lens surface can be expressed as follows:

$$\Delta L \propto \Delta\phi/\nu$$

$$\Delta T \propto \Delta\phi/\nu$$

As is clear from the above expressions, the variation in the aberration coefficients relative to the variation in power of the lens surface is increased as the absolute value of the Abbe number is reduced, that is, as the dispersion is increased. In other words, the power variation necessary for obtaining the desired chromatic aberrations can be reduced by using a high-dispersion material having an Abbe number whose absolute value is small. This means that the chromatic aberrations can be controlled without largely affecting the spherical aberration, the comma aberration, the astigmatism, etc., and that the level of independence of chromatic aberration correction can be increased. Conversely, if a low-dispersion material is used, the power variation necessary for obtaining the desired chromatic aberrations is increased and the aberrations, such as the spherical aberration, are increased accordingly. As a result, the level of independence of chromatic aberration correction is reduced.

Therefore, if the Abbe number of the refractive optical elements GNL is within the range of Conditional Expression (2), the level of independence of chromatic aberration correction can be increased and suitable optical performance can be provided.

It is important that the material of the refractive optical elements GNL have a relatively high dispersion. In addition, it is also important that the partial dispersion ratio of the material of the refractive optical element GNL be larger than that of a general optical material but not excessively different from that of a general optical material.

The numerical range of Conditional Expression (1) can also be set as follows to improve the optical performance:

$$-2.100\times10^{-3}\cdot\nu i+0.693<\theta i<-1.231\times10^{-3}\cdot\nu i+0.900 \quad (1a)$$

The numerical range of Conditional Expression (1) can also be set as follows:

$$-2.100\times10^{-3}\cdot\nu i+0.693<\theta i<-1.389\times10^{-3}\cdot\nu i+0.823 \quad (1b)$$

The numerical range of Conditional Expression (1) can also be set as follows:

$$-1.682\times10^{-3}\cdot\nu i+0.700<\theta i<-1.682\times10^{-3}\cdot\nu i+0.756 \quad (1c)$$

Similar to Conditional Expression (1), when Conditional Expression (2) is satisfied, the chromatic aberrations can be reliably corrected. When Conditional Expression (2) is not satisfied, it becomes difficult to correct the chromatic aberrations.

The numerical range of Conditional Expression (2) can also be set as follows to improve the optical performance:

$$\nu i<25 \quad (2a)$$

Conditional Expression (3) relates to the ratio of the sum of the refractive powers of the refractive optical elements GNL to the refractive power of one of the negative lenses that have the highest dispersion in the lens unit in which the refractive optical elements GNL are disposed.

According to the concept of chromatic aberration correction in the optical system using the refractive optical elements GNL, the refractive optical element G is constituted of the negative lens made of a material having high dispersion (high partial dispersion ratio as a result), as described above. Therefore, the curvature of the wavelength characteristic curve of the chromatic aberration coefficient is increased. Then, the refractive optical elements GNL are configured so as to provide positive refractive powers so as to cancel the curvature.

Thus, Conditional Expression (3) represents a condition for defining the distribution of refractive power among the refractive optical elements GNL and the negative lens, so that the curvature of the wavelength characteristic curve of the chromatic aberration coefficient is adequately balanced and the chromatic aberrations of the optical system can be adequately corrected.

If the value of Conditional Expression (3) is above the upper limit or below the lower limit thereof, it becomes difficult to adequately balance the curvature of the wavelength characteristic curve of the chromatic aberration coefficient and adequately corrected the chromatic aberrations of the optical system. Therefore, it is important to satisfy Conditional Expression (3).

In particular, if the sum of the refractive powers of the refractive optical element GNL is increased and the value of Conditional Expression (3) exceeds the upper limit thereof, the thicknesses of the refractive optical elements GNL are increased accordingly.

The numerical range of Conditional Expression (3) can also be set as follows:

$$-0.6 < \sum_{i=1}^{n} \phi i/\phi G < -0.2 \quad (3a)$$

Conditional Expression (4) relates to the distribution of refractive power among the refractive optical elements GNL. Conditional Expression (4) is satisfied to suppress the difference in refractive power between the refractive optical elements GNL and adequately corrected the chromatic aberrations.

If the refractive power of each refractive optical element GNL is increased and the value of Conditional Expression (4) exceeds the upper limit thereof, the spherical aberration and the chromatic spherical aberration are increased and cannot be corrected by other lenses. As a result, the image performance is degraded. If the refractive power of each refractive optical element GNL is reduced and the value of Conditional Expression (4) becomes lower than the lower limit thereof, the chromatic aberrations cannot be canceled by the refractive optical element G.

The numerical range of Conditional Expression (4) can also be set as follows:

$$0.5<\phi i/\phi a<2.0 \quad (4a)$$

Next, numerical data of first and second numerical examples and the comparative example will be described. In each numerical example, j indicates the number counted from the object side, Rj indicates the radius of curvature of the $j^{th}$ optical surface, Dj indicates the distance between the $j^{th}$ and $(j+1)^{th}$ lens surfaces on the optical axis, and Nj and vj indicate the refractive index and the Abbe number, respectively, of a medium disposed between the $j^{th}$ and $(j+1)^{th}$ lens surfaces. In addition, f is the focal length, Fno is the F number, and ω is the half field angle.

When X is the displacement from the surface vertex of an aspherical surface along the optical axis, h is the height of from the optical axis in a direction perpendicular to the optical axis, r is the paraxial radius of curvature, k is the conic constant, and B, C, D, E, ... are the aspherical coefficients, the shape of the aspherical surface is expressed as follows:

$$x(h) = \frac{(1/r)h^2}{1+\sqrt{\{1-(1+k)(h/r)^2\}}} + Bh^4 + Ch^6 + Dh^8 + Eh^{10}\ldots$$

In the aspherical coefficients, "E±XX" indicates "×10$^{\pm XX}$."

The planes defined by two surfaces closest to the image side in each numerical example (plane having a radius of curvature of ∞) correspond to an insertion filter, an optical low-pass filter, an infrared cut filter, etc.

Table 1 shows the refractive indices with respect to the d-line, g-line, C-line, and F-line, Abbe number, and partial dispersion ratios of the UV-curable resin.

Table 2 shows the numerical values corresponding to the conditional expressions of the numerical examples.

FIRST NUMERICAL EXAMPLE f=784.0 Fno=5.83 2ω=3.16°
j Rj Dj Nj vj
1 144.4811 18.93 1.52384 57.4
2 2422.6216 3.50 1.63555 22.7 (GNL1)
3 −812.0058 (aspherical) 27.06 1.00000
4 114.9373 10.89 1.51337 59.0
5 243.6114 3.50 1.63555 22.7 (GNL2)
6 643.9320 (aspherical) 3.68 1.00000
7 −895.8285 4.00 1.85260 24.4
8 104.1613 49.95 1.00000
9 105.0864 16.34 1.50954 58.0
10 −462.3313 0.15 1.00000
11 52.0409 5.30 1.48700 70.4
12 45.1995 41.89 1.00000
13 343.5289 6.52 1.83675 23.3
14 −77.6193 1.80 1.86931 30.5
15 88.7347 24.70 1.00000
16 ∞ (aperture stop) 41.38 1.00000
17 116.8386 1.30 1.84999 23.0
18 30.4202 5.42 1.61738 34.9
19 −172.9998 1.50 1.00000
20 162.2380 3.43 1.79799 30.1
21 −78.6619 1.30 1.77590 50.2
22 63.4319 3.16 1.00000
23 −92.8249 1.30 1.78000 50.0
24 183.1882 15.98 1.00000
25 224.2273 7.16 1.61335 35.3
26 −33.4453 1.40 1.88500 41.0
27 −66.7376 3.45 1.00000
28 −45.8775 3.77 1.51368 56.3
29 −37.0521 85.74 1.00000
30 ∞ 2.00 1.51633 64.1
31 ∞ 1.00000

Aspherical Coefficients
conic constant (K) 4th order coefficient (B) 6th order coefficient (C) 8th order coefficient (D) 10th order coefficient (E)
k B C D E
3rd surface 0 0.122435E-07 −0.320479E-12 −0.535235E-17 475009E-21
6th surface 0 −0.477882E-08 −0.150196E-13 0.700669E-16 −335628E-20

SECOND NUMERICAL EXAMPLE f=784.0 Fno=5.83 2ω=3.16°
j Rj Dj Nj vj
1 160.5459 20.46 1.51284 56.6
2 −1002.5412 1.80 1.63555 22.7 (GNL1)
3 −530.8053 (aspherical) 33.80 1.00000
4 120.4753 10.25 1.61813 59.9
5 418.2981 1.80 1.63555 22.7 (GNL2)
6 925.0733 (aspherical) 3.55 1.00000
7 −641.7184 4.00 1.85742 26.5
8 111.9823 60.11 1.00000
9 101.9155 (aspherical) 1.80 1.63555 22.7 (GNL3)
10 125.0177 13.46 1.51366 56.3
11 −606.6622 0.15 1.00000
12 116.6758 5.30 1.48700 70.4
13 62.6693 50.91 1.00000
14 315.6112 5.98 1.84999 23.0
15 −92.3843 1.80 1.86479 29.3
16 121.0120 35.50 1.00000
17 ∞ (aperture stop) 30.00 1.00000
18 286.6779 1.30 1.74184 27.4
19 31.7573 5.74 1.72172 52.8
20 −274.3525 1.50 1.00000
21 107.5916 3.43 1.85618 25.1
22 −140.5453 1.30 1.85621 42.9
23 54.4139 20.39 1.00000
24 −101.5449 1.30 1.77397 50.3
25 164.5982 1.50 1.00000
26 92.9677 6.78 1.61215 35.4
27 −27.8733 1.40 1.88431 40.4
28 −71.2895 2.00 1.00000
29 −34.9505 3.14 1.66674 30.6
30 −32.1327 64.06 1.00000
31 ∞ 2.00 1.51633 64.1
32 ∞ 1.00000

Aspherical Coefficients
conic constant (K) 4th order coefficient (B) 6th order coefficient (C) 8th order coefficient (D) 10th order coefficient (E)
k B C D E
3rd surface 0 0.131716E-07 −0.310455E-12 0.149748E-16 −0.140589E-20
6th surface 0 −0.331494E-08 −0.128010E-11 −0.162537E-15 0.215076E-19

9th surface 0 0.551590E-08 −0.223330E-11 −0.787904E-15 0.523679E-19

COMPARATIVE EXAMPLE INCLUDING SINGLE GNL f=784.0 Fno=5.83 2ω=3.160 j Rj Dj Nj vj
1 140.7343 14.96 1.51423 57.5
2 395.2966 7.81 1.63555 22.7 (GNL)
3 −962.8923 (aspherical) 24.20 1.00000
4 112.8879 12.69 1.50603 59.6
5 580.4317 4.05 1.00000
6 −922.8676 4.00 1.84999 23.0
7 107.9676 34.69 1.00000
8 105.7870 16.02 1.52754 51.4
9 −436.6142 0.15 1.00000
10 47.9757 5.30 1.48700 70.4
11 42.1181 43.18 1.00000
12 320.1185 6.91 1.84407 27.8
13 −71.7711 1.80 1.87514 34.5
14 73.2180 22.68 1.00000
15 ∞ (aperture stop) 34.47 1.00000
16 89.5531 1.30 1.84999 23.0
17 33.7380 5.83 1.56592 42.1
18 −222.5698 1.50 1.00000
18 250.0392 3.66 1.77440 29.0
19 −74.8237 1.30 1.77629 50.2
20 80.7694 2.96 1.00000
21 −114.5760 1.30 1.88172 41.2
22 300.3157 17.69 1.00000
23 −19126.6154 6.23 1.66599 30.6
24 −37.2947 1.40 1.88499 41.0
25 −68.0982 10.49 1.00000 0
26 −49.4564 3.64 1.50574 59.7
27 −40.7242 104.30 1.00000
28 ∞ 2.00 1.51633 64.1
29 ∞ 1.00000

Aspherical Coefficients
conic constant (K) 4th order coefficient (B) 6th order coefficient (C) 8th order coefficient (D) 10th order coefficient (E)
k B C D E
3rd surface 0 0.135305E-07 −0.266123E-12 0.172183E-17 0.250574E-21

TABLE 1

| Conditional Expression | | UV-Curable Resin 1 |
|---|---|---|
| | Refractive Index with respect to d-line | 1.63555 |
| | Refractive Index with respect to g-line | 1.67532 |
| | Refractive Index with respect to C-line | 1.62807 |
| | Refractive Index with respect to F-line | 1.65604 |
| (2) | vd (=vi) | 22.7 |
| | θgd | 1.422 |
| (1) | θgF (=θi) | 0.689 |

TABLE 2

| Conditional Expression | | 1st Numerical Example | 2nd Numerical Example | Comparative Example |
|---|---|---|---|---|
| | φG | −0.009154 | −0.009015 | −0.008809 |
| (4) | φa | 0.001336 | 0.000862 | 0.002263 |
| | φ1 | 0.001045 | 0.000564 | 0.002263 |
| | φ2 | 0.001627 | 0.000833 | — |
| | φ3 | — | 0.001187 | — |
| | Σφi | 0.002672 | 0.002585 | 0.002263 |

TABLE 2-continued

| Conditional Expression | | 1st Numerical Example | 2nd Numerical Example | Comparative Example |
|---|---|---|---|---|
| (3) | Σφi/φG | −0.29 | −0.29 | −0.26 |
| (4) | φ1/φa | 0.78 | 0.65 | 1 |
| | φ2/φa | 1.22 | 0.97 | — |
| | φ3/φa | — | 1.38 | — |

Figure 7:
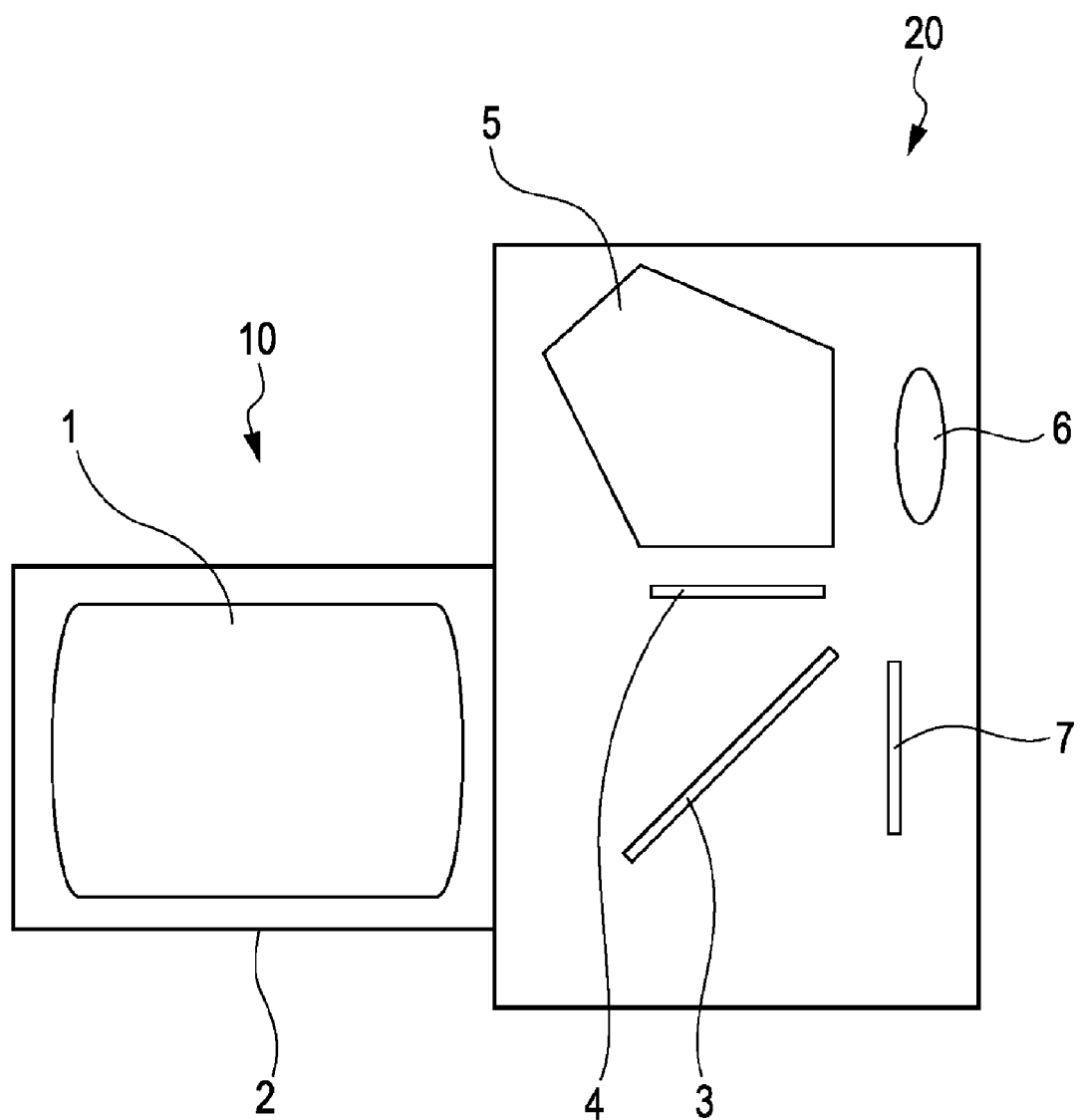
FIG. 7 illustrates a schematic diagram showing the main part of an image pickup apparatus according to an embodiment of the present invention.

An embodiment in which the optical system according to the first or second embodiment is included in an image-pickup apparatus will be descried with reference to FIG. 7.

FIG. 7 is a schematic diagram illustrating the main part of a single-lens reflex camera. Referring to FIG. 7, the single-lens reflex camera includes an imaging lens 10 having an optical system 1 according to the first or second embodiment.

The optical system 1 is held by a lens barrel 2 that functions as a holder. A camera body 20 includes a quick return mirror 3 that reflects light from the imaging lens 10 upward; a focusing glass 4 disposed at an image-forming position of the imaging lens 10; a penta-roof prism 5 which converts an inverse image formed on the focusing glass 4 into an erect image; and an eyepiece 6 toward which the erect image is magnified.

A solid-state image pickup device (photoelectric converter) such as a CCD sensor or a CMOS sensor, or a silver-halide film is disposed on a photosensitive surface 7.

In an image-pickup process, the quick-return mirror 3 is moved away from the optical path and an image is formed on the photosensitive surface 7 by the imaging lens 10.

The advantages described in the first and second embodiments can be obtained by various types of optical apparatuses such as the optical apparatus described in the present embodiment.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-178129 filed Jul. 6, 2007, which is hereby incorporated by reference herein in its entirety.

What is claimed is:

1. An optical system, comprising:
at least one of a movable lens unit movable in an optical axis direction and a fixed lens unit that is not movable in the optical axis direction,
wherein the at least one lens unit includes a plurality of refractive optical elements, the refractive optical elements being made of resin and having focal lengths of the same sign,
wherein, when $N_{gi}$, $N_{Fi}$, $N_{di}$, and $N_{Ci}$ indicate refractive indices, with respect to g-line, F-line, d-line, and C-line, respectively, of a material of the $i^{th}$ refractive optical element from an object side, an Abbe number vi, and a partial dispersion ratio θi of the material of the $i^{th}$ refractive optical element are determined as follows:

$$vi=(N_{di}-1)/(N_{Fi}-N_{Ci})$$

$$θi=(N_{gi}-N_{Fi})/(N_{Fi}-N_{Ci}), \text{ and}$$

wherein the lens unit including the refractive optical elements has one or more negative lenses, and when φi is a refractive power, with respect to d-line, of the $i^{th}$ refractive optical element, φG is a refractive power of one of the negative lenses that is made of a material having the highest dispersion, and $\phi a$ is an average refractive power for d-line of the refractive optical elements, the following conditions are satisfied:

$$-2.100 \times 10^{-3} \cdot vi + 6.93 \times 10^{-1} < \theta i < 0.9$$

$$vi < 30$$

$$-0.9 < \sum_{i=1}^{n} \phi i / \phi G < -0.1$$

$$0.3 < \phi i / \phi a < 3.0$$

wherein i=1, 2, ..., n, and n ≧ 2.

2. The optical system according to claim 1, wherein one of the refractive optical elements included in the at least one lens unit is disposed so as to face the negative lens made of the material having the highest dispersion.

3. The optical system according to claim 2, wherein at least one refractive optical element is positioned on the object side relative to the refractive optical element disposed so as to face the negative lens made of the material having the highest dispersion.

4. The optical system according to claim 1, wherein at least one refractive surface of at least one of the refractive optical elements is aspherical.

5. The optical system according to claim 1, wherein the refractive optical elements are formed by photopolymerization or thermal polymerization of the resin.

6. The optical system according to claim 1, further comprising a first lens unit, a second lens unit, and a third lens unit arranged in that order from the object side, the first lens unit having a positive refractive power and being stationary during focusing, the second lens unit having a negative refractive power and moving in the optical axis direction during focusing, and the third lens unit having a positive refractive power and being stationary during focusing, wherein all of the refractive optical elements are included in the first lens unit.

7. An optical apparatus comprising:
the optical system according to claim 1.

* * * * *